G. E. WALTON.
SELF ADJUSTING SOCKET COUPLING.
APPLICATION FILED AUG. 9, 1915.

1,164,040.

Patented Dec. 14, 1915.

WITNESSES:
Charles Pickles
J. H. Herring

INVENTOR
George E. Walton
BY Strong and Townsend
ATTORNEYS

UNITED STATES PATENT OFFICE.

GEORGE E. WALTON, OF BERKELEY, CALIFORNIA.

SELF-ADJUSTING SOCKET-COUPLING.

1,164,040.  Specification of Letters Patent.  Patented Dec. 14, 1915.

Application filed August 9, 1915. Serial No. 44,381.

*To all whom it may concern:*

Be it known that I, GEORGE E. WALTON, a citizen of the United States, residing at Berkeley, in the county of Alameda and State of California, have invented new and useful Improvements in Self - Adjusting Socket-Couplings, of which the following is a specification.

This invention relates to a self-adjusting socket coupling.

The object of the present invention is to provide a simple substantial socket coupling for pipe lines and the like, and particularly to provide a coupling of the character described, which is self-adjusting to prevent leakage and take up wear between the contacting faces.

The invention consists of the parts and the construction and combination of parts as hereinafter more fully described and having references to the accompanying drawings, in which—

Figure 1:
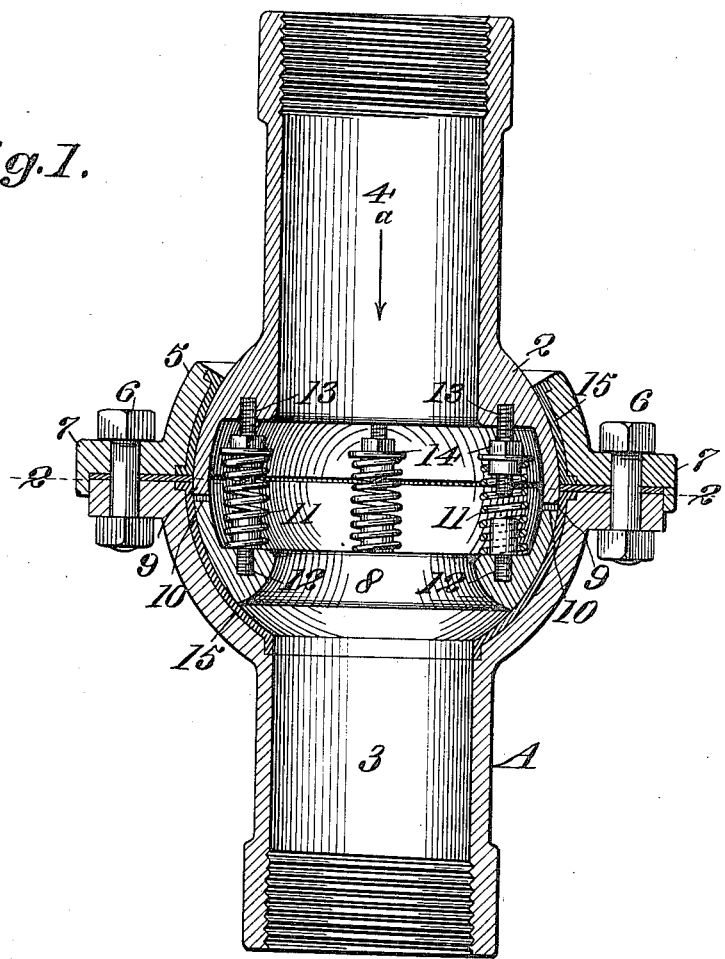
Figure 2:
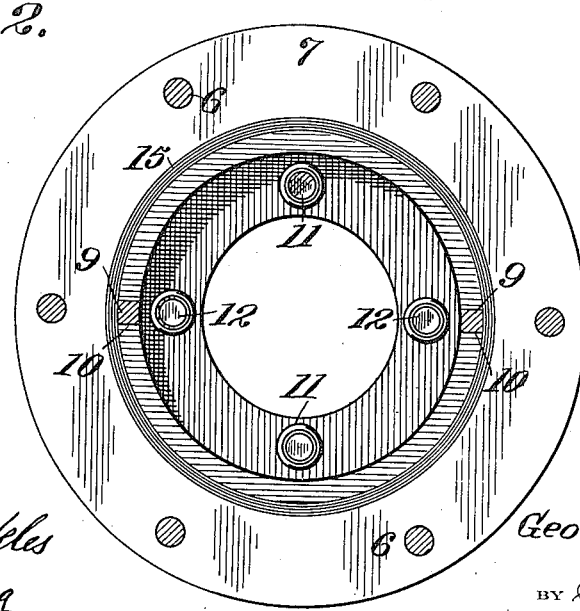

Figure 1 is a central, vertical section through the coupling. Fig. 2 is a cross section on line 2—2, Fig. 1.

Referring to the drawings in detail, A indicates in general, a socket casing and 2 a ball member mounted interior thereof. Both the socket and ball member are provided with pipe like extensions such as indicated at 3 and 4, to which the hose or pipe line may be attached. The socket casing is in this instance made of two separable sections, A and 5 which are secured together when the ball portion of the socket is mounted in position, by means of bolts 6 passing through flanges 7, formed on members A and 5. The ball portion of the socket is in this instance centrally divided into two sections 2 and 8, which are guided with relation to each other by means of lugs 9 formed on section 2, which projects into grooves 10 formed on section 8. Interposed between the two separable sections 2 and 8, are coil-springs 11, of which there may be any suitable number. These springs may be either square or round and are held in position by means of projecting studs 12 and 13, suitably secured in the two separable sections 2 and 8.

The springs 11 are provided for the purpose of normally expanding the separable sections of the ball member with relation to each other, against the interior face of the socket casing A, and will in this manner automatically take up any wear between the socket casing and ball member, and also prevent leakage around or between same.

For the purpose of increasing or decreasing the tension of the individual springs, locking nuts such as indicated at 14 have been provided, these may be mounted on either one or both studs, but in actual practice, it has been found necessary to place the locking nuts on one side only, as the studs are sufficiently long to permit the tension of the springs to be increased or decreased, as conditions may warrant. The inner face of the socket casing is preferably lined with babbitt, or other material such as indicated at 15, which may be renewed from time to time, when sufficient wear has taken place, in this manner increasing the life and utility of the coupling practically indefinitely.

In practice, it will be understood that the hose or pipe line may be attached to extensions 3 and 4 in any suitable manner, as this does not form any feature of the present invention. It has been found, however, most desirable to pass the liquid through the coupling in the direction of arrow *a;* the ball member of the coupling in this manner becomes the intake side and the socket casing the discharge. In using a socket coupling constructed as here shown, it becomes possible to couple directly with the main pipe line without interposing flexible hose sections, as movement of the ball member with relation to the socket casing is sufficient to permit said member to move approximately 45° in any direction, the coupling is in this manner well suited for oil steamers, as the movement of the coupling will take up any roll or rise of the ship while discharging, a tight joint being always maintained by means of springs 11.

The coupling is otherwise simple, substantial in construction, cheap to manufacture and easily taken apart, as it is only necessary to remove bolts 6 to separate the entire coupling.

The materials and finish of the several parts of the device may be otherwise such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what

I claim and desire to secure by Letters Patent is—

1. In a coupling, a hollow socket member, a hollow ball member in the socket member composed of two longitudinal sections one movable with respect to the other, each of said sections having interior enlargements forming a right angular wall extending outwardly from the bores of the members, studs arranged in pairs and connected to the respective walls of the ball sections, said studs having their inner ends spaced, coil springs for the respective pairs of studs extending across the meeting line of the sections, the springs at one end seating on one of the walls, and nuts on one of the studs of the respective pairs engaging the other ends of the springs.

2. In a coupling, a socket member, a ball member composed of two sections one longitudinally movable with respect to the other, and a series of independent springs pressing outwardly against the two sections to force the latter apart and being disposed longitudinally of said members.

3. In a coupling, a socket member, a ball member composed of two sections one longitudinally movable with respect to the other, a series of independent springs pressing outwardly against the two sections to force the latter apart and being disposed longitudinally of said members, and means for enabling independent adjustment of the tension of the respective springs.

4. In combination with a pair of pipes one of which has a socket member, a ball member received in the socket member and being composed of two sections each centrally bored and one longitudinally movable with respect to the other, each of said sections being interiorly enlarged and the enlargements communicating with the bores, and spring means in the enlargements accessible from the bores of said sections.

In testimony whereof I have hereunto set my hand in the presence of two subscribing witnesses.

GEORGE E. WALTON.

Witnesses:
    JOHN H. HERRING,
    W. W. HEALEY.